United States Patent Office 3,661,769
Patented May 9, 1972

3,661,769
PROCESS FOR REFORMING A NAPHTHA FEEDSTOCK IN THE PRESENCE OF A PLATINUM-TUNGSTEN-ALUMINA CATALYST
Paul B. Venuto and Thaddeus E. Whyte, Jr., Cherry Hill, N.J., assignors to Mobil Oil Corporation
Filed Nov. 23, 1970, Ser. No. 91,971
Int. Cl. C10g 35/06, 35/08
U.S. Cl. 208—139                                    10 Claims

ABSTRACT OF THE DISCLOSURE

A method for reforming a naphtha feedstock which comprises contacting the same with a catalyst that contains platinum and tungsten on a porous support.

BACKGROUND OF THE INVENTION (1) Field of the invention

This invention relates to a novel catalytic composition and its use as a reforming catalyst. More specifically, this catalyst comprises a tungsten component and a platinum component added to a porous solid support such as alumina. The addition may be simultaneous or sequential.

(2) Description of the prior art

Catalytic reforming of naphtha feed stocks has long been known in the petroleum industry. Most naphtha feeds contain large amounts of naphthenes and paraffins and consequently have low octane numbers. By means of various hydrocarbon conversion reactions catalytic reforming has improved the octane number of naphtha feed stocks. Some of the more important conversion reactions that take place during catalytic reforming are dehydrogenation of naphthenes to aromatics, dehydrocyclization of paraffins to naphthenes and aromatics and isomerization of normal paraffins to isoparaffins. A less desirable reaction that also occurs during reforming is the hydrocracking of long chain paraffins to gaseous hydrocarbons such as methane and ethane.

The above reforming reactions have previously been catalyzed by porous supports such as alumina that have dehydrogenation-promoting metal components impregnated or admixed with the support. Platinum on alumina and, more recently, platinum-rhenium on alumina are examples of these catalysts.

Reforming catalysts should possess high selectivity, high activity and good stability. Selectivity is the ability of a catalyst to produce high yields of high octane products, such as aromatics, from compounds that have low octane numbers, such as napthenes and paraffins. The activity of a catalyst is the ability to convert the feed stock into all products without regard to selectivity. A stable catalyst is highly desirable so that the activity and selectivity characteristics of a catalyst can be maintained during prolonged periods of operation.

The platinum on alumina catalysts are highly selective for the production of high octane aromatics. The platinum-rhenium supported catalyst has exhibited longer run lengths with higher activity than a platinum supported catalyst without rhenium.

The catalyst of the present invention combines the high selectivity for aromatics of the platinum on alumina catalyst with the high activity and stability of the platinum-rhenium on alumina catalyst.

SUMMARY OF THE INVENTION

This invention provides a method for reforming naphtha feed stock by contacting the same with a novel catalytic composition which comprises a solid porous support upon which a platinum component and a tungsten component have been added.

DESCRIPTION OF THE INVENTION

Figure 1:
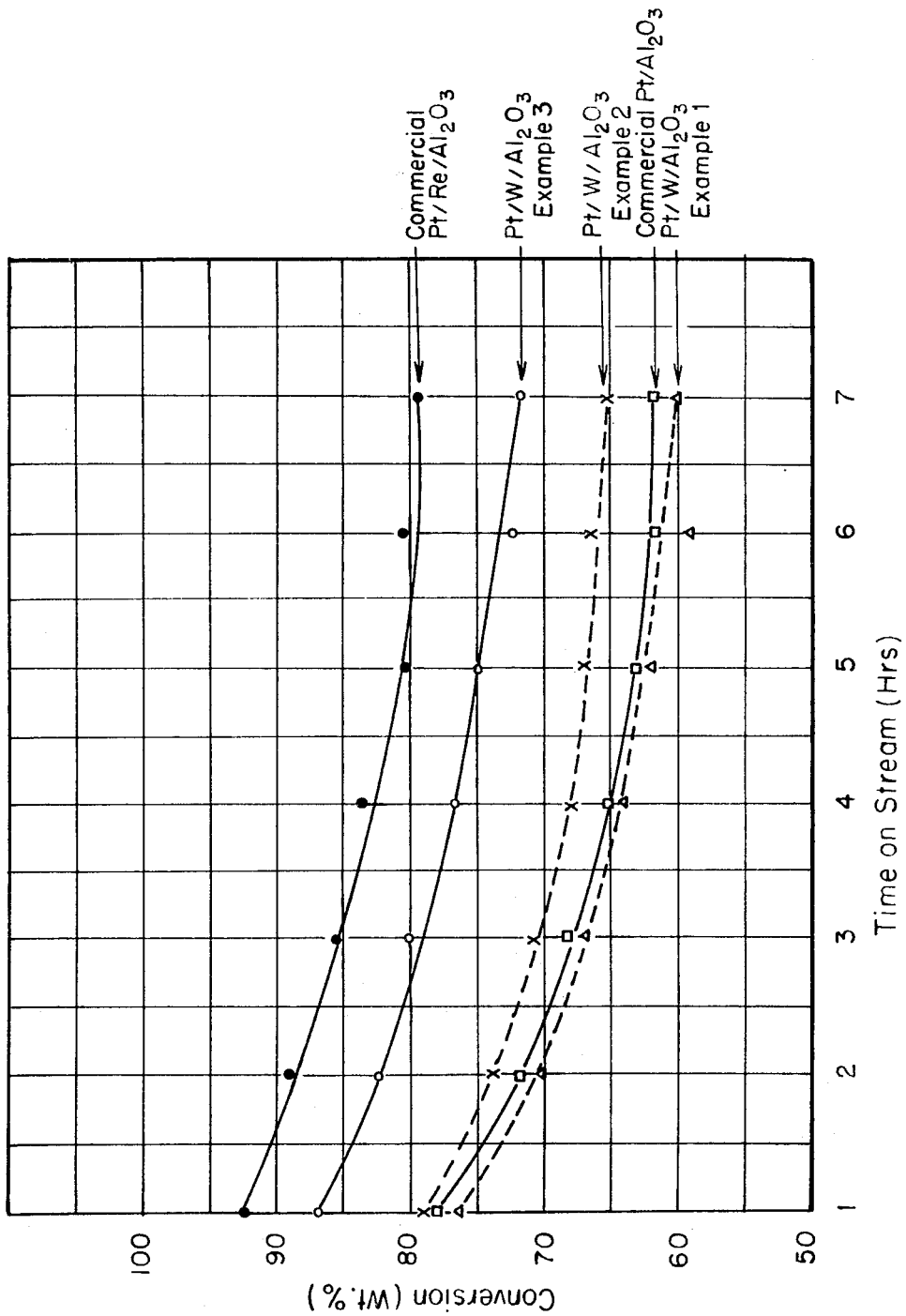
FIG. 1 compares the activity for the conversion of n-octane of one platinum/alumina, one platinum-rhenium/alumina and three platinum-tungsten/alumina reforming catalysts.

The platinum and tungsten components may be deposited on a large number of solid porous supports. These supports can include naturally occurring and synthetically produced aluminosilicates. They can also include inorganic oxides such as magnesia and alumina.

A particularly preferred support for this invention is alumina. Any of the various forms of alumina that are suitable as reforming supports may be used. Numerous preparations of alumina described in the prior art are satisfactory for the purposes of this invention.

The amount of platinum that is impregnated or admixed with the porous solid support is from about 0.01 to 3 weight percent, with a preferred range from about .1 to about 1 percent.

The amount of tungsten that is impregnated or admixed with the porous support is from about 0.01 to about 3 percent, with a preferred range from about .1 to about 1 percent. The above figures are based on the final catalyst composition.

The tungsten and platinum components may become associated with the porous support by the following methods. An existing platinum on alumina or other porous support catalyst can be impregnated with a tungsten source such as a tungsten complex, tungsten halide, oxygenated tungsten compound, or a tungsten acid. Non-limiting examples of suitable tungsten compounds are $H_2WO_4$, $WCl_6$, $WO_2Cl_2$ and $WOCl_4$.

An alternate method is to impregnate or otherwise add to a tungsten supported catalyst a source of platinum. This source of platinum may be a platinum complex, a halide, a platinum-oxygen complex, a platinum acid, or other platinum containing compounds. Non-limiting examples of suitable platinum compounds are $H_2PtCl_6$, $[Pt(NH_3)_4]Cl_2 \cdot H_2O$ and $PtCl_4$. Another alternate method of preparation is to add a platinum compound from the above mentioned sources to a composition in which tungsten has been intimately dispersed in a support as alumina.

A preferred method of preparation is the simultaneous addition of the platinum and tungsten sources, dissolved in a suitable solvent such as ethyl alcohol to a suitable support. This method appears to increase the possibility of a platinum-tungsten interaction in a configuration favorable to catlayzing aromatization.

The resultant compositions are dried by heating the composite in an inert atomsphere such as nitrogen to a temperature of not more than 390° F. and preferably not more than 250° F. The catalytic compositions are then reduced, preferably in a hydrogen atmosphere by heating to a temperature of about 800° F. to about 1,200° F. and preferably from about 850° F. to about 950° F. This heating in hydrogen transforms the above catalytic composition to an active state for aromatization.

The feedstock that is employed in these reforming operations is generally a naphtha fraction that boils from about 100° F. to about 450° F. A preferable range is from about 150° F. to about 300° F. n-Octane is an example of a typical paraffin component found in naphtha fractions with the above boiling ranges.

Reforming with the above platinum-tungsten catalyst can cause certain undesirable side reactions in the initial stages of a reforming run. Pretreating of the platinum-tungsten catalyst with a hydrogen-hydrocarbon charge stock under specified conditions, subsequent to a reduction of fresh or regenerated catalyst, but prior to an actual reforming run will result in the substantial elimination of side reactions such as cracking, hydrocracking, hydrogenolysis, and ring opening. Such pretreatment will eliminate serious temperature excursions in the early stages of a reforming reaction and contribute to the yield stability and lifetime of the platinum-tungsten catalyst. The pretreating hydrocarbon charge stock should contain not more than 20 p.p.m. of sulfur and preferably not more than 5 p.p.m.

More specifically, this pretreatment comprises contacting the platinum-tungsten/alumina catalyst for at least about one hour with a hydrogen-hydrocarbon charge stock which contains at least 50 volume percent aromatics and preferably 80 volume percent aromatics.

In a preferred embodiment, a platinum-tungsten/alumina bimetallic reforming catalyst is contacted with a mixture of hydrogen and light hydrocarbon fraction, such as naphtha. This hydrocarbon fraction should have a boiling range of $C_6$-290° F., more preferably, $C_6$-380° F. and most preferred between 290° and 380° F. The hydrocarbon fraction should contain at least 50 volume percent of aromatics and most preferably at least 1 to 2 volume percent of dicyclic or polycyclic aromatics. The contact period should be from about one hour to about two days with a preferred range from about one to about sixteen hours. The contact temperature is between about 800 and about 1,000° F. with a preferred range between about 875 and 925° F. The above pretreatment should be carried out at a pressure of about 75 to about 600 p.s.i.g., with a preferred range of 150 to 250 p.s.i.g. The $H_2$/HC ratio should be about 2:1 to about 10:1 with a preferred range of 3:1 to about 7:1. An L.H.S.V. of from about 3.0 about 8.0 is employed in the pretreatment with a preferred range of 4.0 to 5.0. The L.H.S.V. is ultimately lowered to about 1.0 to about 1.5 when the actual reforming reaction is to begin.

An alternate, but less desirable, method for pretreating the platinum-tungsten reforming catalyst, comprises contacting the above catalyst with a sulfur compound and/or sulfiding the catalyst during the initial period of the reforming reaction. The presulfiding can be accomplished by contacting the platinum-tungsten reforming catalyst with a sulfur containing gas, such as $H_2S$, prior to utilization of the catalyst in a reforming run. The presulfiding should be carried out in situ. Alternately, it has been found that a small amount of a sulfur containing compound added to the reforming zone in the early stages of a reforming run will substantially reduce the amount of light hydrocarbon gases produced by excess hydrocracking activity. The exact form of the sulfur is not critical. The sulfur containing compound may be added into the reforming zone by numerous convenient methods. For example, the sulfur containing compound may be contained in the liquid hydrocarbon feed or the hydrogen rich gas. The addition of sulfur to the reforming catalyst must be comparatively short with respect to the overall length of time the catalyst is used in a reforming run. The time will vary with the amount of sulfur added, the severity of conditions and the platinum-tungsten ratio.

The following examples will illustrate the preparation and utility of these novel reforming catalysts. In the following examples the term Pt-W/$Al_2O_3$ refers to a platinum component and a tungsten component added to an alumina support.

EXAMPLE I 0.68 gram of $H_2WO_4$ was dissolved in 175 cc. of water at room temperature. This solution was added to 100 grams of powdered 0.35 weight percent platinum on alumina. The composite was slowly dried in an oven at 250° F. for 16 hours at atmospheric pressure. The resulting Pt-W/$Al_2O_3$ catalyst contained 0.61 weight percent tungsten.

EXAMPLE II 0.54 gram of $WCl_6$ was dissolved in 50 ml. of deoxygenated and dried benzene at room temperature. This solution was added to 50 grams of a 0.35 weight percent platinum on alumina support. The support had been sized to 100 mesh and dried at 390° F. for 16 hours at atmospheric pressure. The resultant composite was allowed to stand overnight in a dry nitrogen atmosphere. The composite was then dried at 155° F. for 4 hours in a nitrogen atmosphere and finally dried at 250° F. for 16 hours in a nitrogen atmosphere. The resultant Pt-W/$Al_2O_3$ catalyst contained 0.32 weight percent tungsten.

EXAMPLE III 0.38 gram of $WCl_2$ and 0.44 gram of $H_2PtCl_6$ were dissolved in 50 cc. of absolute ethyl alcohol in a dry box. The solution was then removed from the dry box and mixed with 50.13 grams of eta-alumina. The ethyl alcohol was evaporated by stirring on a low hot plate while blowing a stream of nitrogen over the solution. The resultant Pt-W/$A_2O_3$ catalyst was dried in an oven at 250° F. for 16 hours.

The above catalyst preparations along with commercial platinum-rhenium/alumina and commercial platinum/alumina reforming catalysts were tested for their ability to convert n-octane to aromatic products. The reaction conditions were as follows:

($H_2$/HC) mole=8.1
L.H.S.V.=4.4
Pressure=200 p.s.i.g.
Temperature=900° F.
Catalyst volume=7 cc.

All the catalysts were reduced in situ for 16 hours with hydrogen, at atmospheric pressure at 900° F.

The liquid product was collected every hour for seven hours and analyzed via gas-liquid chromatography. Gas samples were taken during the second and sixth hours and analyzed via mass spectroscopy. The results are shown in FIGS. 1 and 2.

Figure 2:
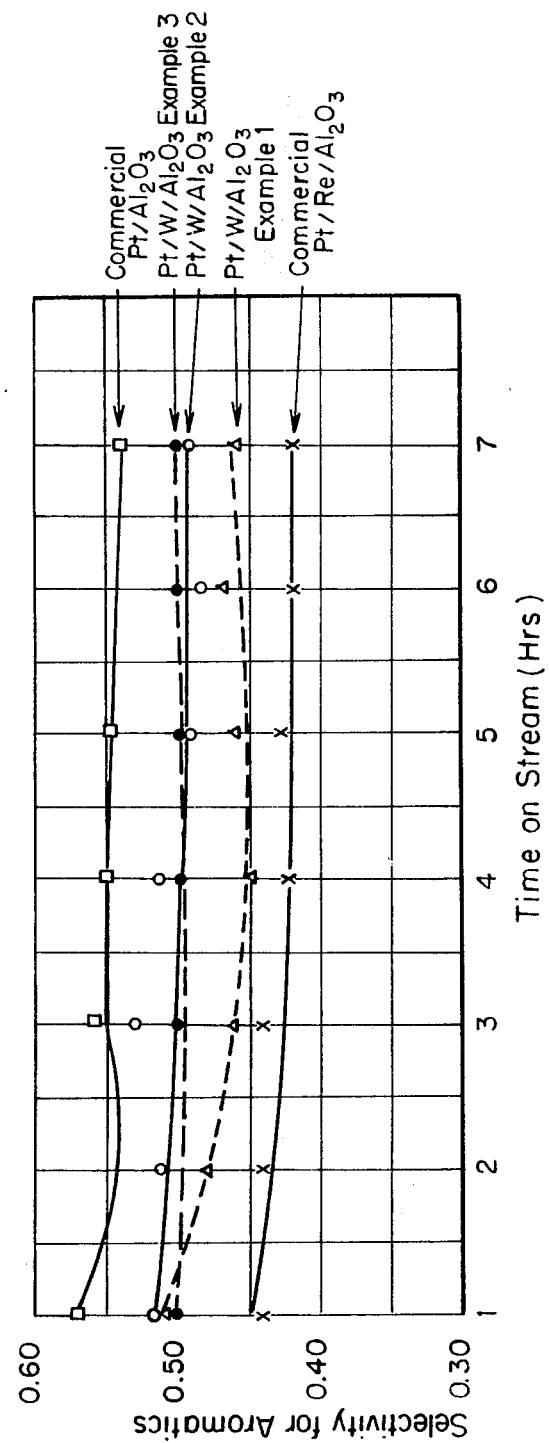
FIG. 2 compares the selectivity of one platinum/alumina, one platinum-rhenium/alumina and three platinum-tungsten/alumina reforming catalysts for converting n-octane to aromatic products.

FIG. 1 indicates that the commercial platinum-rhenium/alumina reforming catalyst is the most active of the 3 types of catalysts tested. However, FIG. 2 indicates that the platinum-rhenium/alumina reforming catalyst is the least selective of the 3 types of catalysts tested. From these results it can be seen that the new Pt-W/$Al_2O_3$ catalysts combine the best features of the Pt-Re/$Al_2O_3$ and the Pt/$Al_2O_3$ catalysts. The Pt-W/$Al_2O_3$ are more selective than the Pt-Re/$Al_2O_3$ catalyst and the preferred Pt-W/$Al_2O_3$ preparation is more active than the Pt/$Al_2O_3$ reforming catalyst.

What is claimed is:
1. A process for reforming a naphtha feedstock which comprises contacting said feedstock under reforming conditions with a solid porous support which contains a platinum component and a tungsten component.
2. A process according to claim 1 wherein the platinum component is about .01 precent to about 3 percent.
3. A process according to claim 1 wherein the platinum component is about .1 percent to about 1 percent.
4. A process according to claim 1 wherein the tungsten component is about .01 percent to about 3 percent.
5. A process according to claim 1 wherein the tungsten component is about .1 percent to about 1 percent.
6. A process according to claim 1 wherein the solid porous support is alumina.

7. A process according to claim 1 wherein the platinum component is selected from the group of compounds consisting of $H_2PtCl_6$, $[Pt(NH_3)_4]Cl_2 \cdot H_2O$ and $PtCl_4$.

8. A process according to claim 1 wherein the tungsten component is selected from the group consisting of $H_2WO_4$, $WCl_6$, $WO_2Cl_2$ and $WOCl_4$.

9. In a process for reforming a naphtha feed stock by contacting under reforming conditions with a solid porous support which contains a platinum component and a tungsten component, the improvement which comprises pre-treating said catalyst by contacting with a mixture of hydrogen and hydrocarbon charge stock containing at least 50 volume percent aromatics for at least about 1 hour; at a temperature of between about 800 and 1,000° F.; at a pressure of about 75 to about 600 p.s.i.g.; at a hydrogen to hydrocarbon ratio of about 2:1 to about 10:1 and a L.H.S.V. of about 3 to about 8.

10. A process according to claim 9 wherein the contact time is about 1 hour to about 16 hours; the temperature is between about 875 to about 925° F.; the pressure is from about 150 to 250 p.s.i.g. and the hydrogen to hydrocarbon ratio is from about 3:1 to about 7:1.

References Cited
UNITED STATES PATENTS

| | | | |
|---|---|---|---|
| 3,558,479 | 1/1971 | Jacobson et al. | 208—139 |
| 3,562,148 | 2/1971 | Mitsche | 208—139 |
| 3,577,353 | 5/1971 | White | 252—465 |
| 3,381,048 | 4/1968 | Lovell et al. | 208—139 |
| 3,184,404 | 5/1965 | Flinn et al. | 252—465 |

TOBIAS E. LEVOW, Primary Examiner

W. F. W. BELLAMY, Assistant Examiner

U.S. Cl. X.R.

252—465

PO-1050
(5/69)

UNITED STATES PATENT OFFICE
CERTIFICATE OF CORRECTION

Patent No. 3,661,769      Dated May 9, 1972

Inventor(s) Paul B. Venuto and Thaddeus E. Whyte, Jr.

It is certified that error appears in the above-identified patent and that said Letters Patent are hereby corrected as shown below:

Column 2, line 60      "catlayzing" should read --catalyzing--

Column 4, line 24      "$WCl_2$" should read --$WCl_6$--

Column 4, line 30      "Pt-W/$A_2O_3$" should read --Pt-W/$Al_2O_3$--

Signed and sealed this 5th day of September 1972.

(SEAL)
Attest:

EDWARD M. FLETCHER, JR.
Attesting Officer

ROBERT GOTTSCHALK
Commissioner of Patents